United States Patent Office 3,657,354
Patented Apr. 18, 1972

3,657,354
PROCESS FOR PREPARING ALCOHOLS AND ALDEHYDES FROM OLEFINS
Friedrich Asinger, Aachen, Germany, assignor to Ethyl Corporation, New York, N.Y.
No Drawing. Filed Apr. 15, 1968, Ser. No. 721,201
Int. Cl. C07c 45/02
U.S. Cl. 260—604 R                                26 Claims

ABSTRACT OF THE DISCLOSURE

A process is described for preparing alcohols and aldehydes, by reacting olefins, carbon monoxide and water using a rhodium or iridium oxide or sulfide as the catalyst in the presence of an alkanol or tertiary amine solvent. The reaction is carried out at elevated temperatures (to about 300° C.) and under pressures above atmospheric (to 500 atmospheres).

The alcohols and aldehydes produced contain one carbon atom more than the starting olefin; they are especially useful as solvents and intermediates for the preparation of carboxylic acids, for example.

BACKGROUND OF THE INVENTION

The reaction of an olefin with carbon monoxide and hydrogen using a cobalt carbonyl catalyst to prepare aldehydes is well known. This reaction is commonly called the Oxo reaction. Use of more sophisticated cobalt carbonyl/trialkyl phosphine complex as the catalyst permits in situ reduction of the Oxo aldehyde to the corresponding alcohol.

On the other hand, the reaction of an olefin with carbon monoxide and water using cobalt carbonyl, nickel carbonyl or iron carbonyl is known to produce carboxylic acids; U.S. 2,448,368, U.S. 2,593,440, and R. Ercoli, Chem. Ind. (Milan), 37 (13), 1029–32 (1955).

The reaction of an olefin with carbon monoxide and water is also known to produce alcohols when using an iron carbonyl/heterocyclic tertiary amine complex catalyst. This is known as the Reppe alcohol synthesis; Liebig's Ann. Chem., 582, 133 (1953).

Both the Oxo and Reppe processes are used commercially for preparing alcohols. In each case, a complex carbonyl-containing catalyst must be used.

I have discovered that by using a very simple catalyst system (a rhodium or iridium oxide or sulfide) both alcohols and aldehydes can be prepared from the reaction of an olefin, carbon monoxide and water in an alcohol or tertiary amine reaction medium. Using this catalyst system, alcohol formation is favored with the tertiary amine while aldehyde formation is favored with the alkanol medium. Thus, the simplicity of the catalyst system coupled with the product control feature of the process offers outstanding advantages to the chemical process art.

SUMMARY OF THE INVENTION

A process for preparing mixtures of alcohols and aldehydes which comprises reacting $C_2-C_{40}$ olefins with carbon monoxide and water using a catalytic quantity of a rhodium oxide or sulfide as the catalyst in a $C_1-C_{12}$ alkanol or a tertiary amine reaction medium at temperatures of up to about 300° C. and pressures of up to about 500 atmospheres.

Rhodium sesquioxide is an especially effective catalyst.

DESCRIPTION OF THE PREFERRED EMBODIMENTS

The present invention is embodied in a process for preparing aldehydes and alcohols by reacting a $C_2-C_{40}$ olefin with carbon monoxide and water in the presence of alkanols having up to 12 carbon atoms or tertiary amines, using as the catalyst a rhodium or iridium oxide or sulfide, at temperatures up to 300° C. and pressures up to about 500 atmospheres. In another preferred embodiment, the process is carried out using a monoolefin as a reactant. Other more preferred embodiments are the process described above using rhodium oxide as the catalyst.

An especially preferred embodiment is the process described above wherein rhodium sesquioxide is the catalyst.

Other preferred embodiments will be described in examples below.

Unsaturated organic compounds which are useful in the present process are those having at least one non-aromatic carbon-to-carbon double bond. These compounds include mono-unsaturates, that is, compounds having one carbon-to-carbon double bond as well as poly-unsaturates, that is, compounds having two or more carbon-to-carbon double bonds.

Examples of useful unsaturated compounds are 2-methyl butene-1, 1,3 - butadiene, dicyclopentadiene, 1,6,8-octadecatriene, $C_{30}$-monoolefin, $C_{40}$-diolefin, isoprene, 1,3-dodecadiene, 1,3-tetracosadiene and the like. Useful unsaturated compounds may also contain other functional groups such as hydroxy, halo, nitro and the like. Where these other functional groups are present in the unsaturated organic compound they must be in a position relative to the carbon-to-carbon double bond such that these functional groups do not adversely affect the reaction in the present process. Examples of useful unsaturated organic compounds are 4-chloro-octene-1, oleic acid, 9 - hydroxy-tetradecene-1, 4 - nitrododecene-2, styrene, allyl chloride, vinyl chloride and the like.

Preferred unsaturated organic compounds are olefins containing from 2 to about 40 carbon atoms. By olefins, I mean hydrocarbons having at least one carbon-to-carbon non-aromatic double bond. The preferred olefins are those having only one double bond (monoolefins) or two non-conjugated double bonds (non-conjugated dienes). Non-conjugated means that the two double bonds are separated by at least one carbon atom. Examples of useful non-conjugated dienes are 1,7-octadiene, cyclooctadiene - 1,5, 1,5 - pentadiene, 1,9 - heptadecadiene, 1,6-tetracosadiene, 1,13 - tetradecadiene, $C_{40}$-diene, $C_{30}$-diene, and the like. Useful monoolefins include terminal as well as internal olefins. Examples of useful monoolefins are ethylene, hexene - 3, propylene, heptene-2, cyclohexene, cyclooctene, butene - 1, dodecene-2, diisobutylene, 4,6,6-trimethylheptene-1, dodecene-2, eicosene-3, nonene-3, nonene-4, 2-methylhexene-1, hexadecene-5, triisobutylene, tetracosene-1, $C_{30}$-monoolefin, $C_{40}$-monoolefin, propylene trimer, propylene tetramer, and the like. Mixtures of terminal and internal monoolefins are also useful.

The catalyst which is used in the present invention is a rhodium or iridium oxide or sulfide. Examples of useful catalysts are rhodium monosulfide, rhodium sesquisulfide, iridium dioxide, iridium disulfide, iridium sesquioxide, iridium sesquisulfide, and the like. Mixtures of the oxides and sulfides are also useful. Preferred catalysts are the rhodium oxides such as rhodium sesquioxide ($Rh_2O_3$) and rhodium dioxide ($RhO_2$); rhodium sesquioxide is a most preferred catalyst.

In carrying out the reaction, an amount of catalyst is used which is sufficient to initiate and continue the reaction under the conditions herein described. Sufficient catalyst is used to provide at least about 0.0001 mole of rhodium or iridium per mole of olefin. Amounts of catalyst which provide from about 0.0001 to about one mole of rhodium or iridium per mole of olefin are conveniently used.

The amount of water which is used in carrying out the process of this reaction may vary over a wide range. Since water enters into the reaction with the olefin and carbon monoxide, it is desirable to have at least the stoichiometric amount of water present when running the reaction. In general, amounts of water sufficient to have an olefin:water molar ratio of from about 1:1 to about 1:10 are used. Olefin:water molar ratios of from about 1:1 to about 1:5, are conveniently used. Since the olefins, especially the higher olefins and water are relatively immiscible, it is advantageous to stir the mixture during the reaction process.

As pointed out above, this process is carried out in the presence of an alkanol or tertiary amine reaction medium.

The first type of suitable reaction media are the $C_1$–$C_{12}$ alkanols. These alkanols may be branched or straight chain, primary, secondary, or tertiary and preferably monohydroxy. Examples of useful alcohols are ethanol, n-dodecanol, t-butanol, isoamyl alcohol, 2-pentanol, isopropanol, n-octanol, 2-ethyl-n-hexanol, 1,3,3-tri-methyl-n-pentanol, n-pentanol, sec-butanol, n-decanol, and the like. The alkanols having 1 to 5 carbon atoms are preferred. Methanol is a most preferred alkanol reaction medium.

The second type of useful reaction media is a tertiary amine. A tertiary amine is one having no hydrogen bound directly to an amine nitrogen. Amines which are useful in the present system include alkyl amines, aralkyl amines and heterocyclic amines. These amines may have one or more tertiary amine nitrogens in their structure.

One class of useful amines is represented by the formula

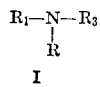

I $R_1$, $R_2$ and $R_3$ in Formula I are independently selected from alkyl groups and phenylalkyl groups. Especially preferred amines having Formula I are those in which $R_1$, $R_2$, and $R_3$ are independently selected from $C_2$–$C_4$ alkyl groups and phenyl-$C_1$–$C_4$-alkyl groups. Examples of useful amines of this type are tricyclohexylamine, trimethylamine, tri-n-dodecylamine, triisobutylamine, tris(2-ethyl-n-hexyl)amine, dimethylisobutylamine, isopropyl-n-heptyl-n-decylamine, tris(6-phenyl-n-hexyl)amine, ethyl bis(12-phenyl-n-dodecyl)amine and the like. Especially preferred amines of this class are exemplified by triethylamine, tri-n-butylamine, triisopropylamine, diethyl-sec-butylamine, ethyl-n-propylisobutylamine, diethylbenzylamine, dibenzyl-n-butylamine, benzylisopropyl-n-butylamine, tribenzylamine, tris(4-phenyl-n-butyl)amine, tris(2-phenylethyl)amine and the like.

Another class of useful tertiary amines have the formula

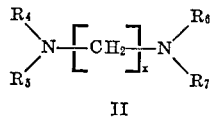

II

In Formula II, $R_4$–$R_7$ are alkyl groups and $x$ is an integer from 2–4. Preferred amines having Formula II are those in which $R_4$–$R_7$ are $C_1$–$C_4$ alkyl groups and $x$ is 2 or 3. Useful amines of this class are N,N,N',N'-tetramethyl-1,4-butanediamine, N,N,N',N'-tetra-n-hexylethylenediamine, N,N-di-n-pentyl-N',N'-diethyl-1,3-propanediamine and the like. Preferred diamines of Formula II are N,N,N',N'-tetraethyl-1,3-propanediamine, N,N,N',N'-tetra-sec-butylethylenediamine, N,N-dimethyl-N',N'-diethylethylenediamine, N,N,N',N'-tetramethylethylenediamine and the like.

Another class of useful amines are the fully alkylated alkylene polyamines. These amines have more than two amine nitrogens in the molecule. Fully alkylated triethylenetetraamine, tetraethylenepentaamine, diethylenetriamine are examples of this type of useful amine. The alkyl groups substituted on the amine nitrogens in this class of amines may have from 1–4 carbon atoms.

Another class of useful amines is saturated heterocyclic amines. These amines include N-alkylmorpholines, N-alkylpyrrolidines, N-alkylpiperidines and N,N'-dialkylpiperazines. A preferred class of these amines are those in which the N-alkyl substituents have from 1–4 carbon atoms. Examples of useful amines of this class are N-ethylmorpholine, N-n-dodecylpyrrolidine, N-n-octylpyrrolidine, N-neopentylpyrrolidine, N-n-decylpiperidine, N-n-heptylpiperidine, N-n-undecylpiperidine, N,N'-di-n-octylpiperazine, N,N'-di-n-hexylpiperidine, N,N'-di-n-dodecylpiperazine and the like. Preferred heterocyclic amines are exemplified by N-methylmorpholine, N-isobutylpyrrolidine, N-methylpyrrolidine, N-n-propylpiperidine, N-isopropylpiperidine, N-tert-butylpiperidine, N-methylpiperidine, N,N'-dimethylpiperazine, N,N'-diethylpiperazine, N,N'-sec-butylpiperazine, N-n-butylpyrrolidine and the like.

N-methylpyrrolidine is an especially preferred tertiary amine reaction medium.

Both aldehydes and alcohols are obtained as products in the present process. The reaction will proceed as well in either the alcohol or heterocyclic reaction medium. The reaction medium does have an effect on the ratio of alcohol to aldehyde obtained in the reaction. As the examples below will illustrate, the alkanol system favors aldehyde production while the tertiary amine system favors alcohol production. In general, the molar ratio of alkanol or tertiary amine to olefin used in carrying out the reaction ranges from about 0.1:1 to about 10:1. Reaction medium to olefin molar ratios of from about 0.5:1 to about 5:1 are conveniently used.

Since the third reactant in the process is carbon monoxide (CO), the process of the present invention is carried out at pressures above atmospheric. The pressure is due for the most part to the carbon monoxide. CO pressures ranging up to about 500 atmospheres (atm.) are conveniently used. CO presures ranging from about 10 to about 500 atmospheres can be used. Pressures ranging from 50 to about 300 atmospheres are conveniently used. The pressure is not critical except that at least a stoichiometric amount of CO should be supplied to the system. By stoichiometric amount, I mean at least one mole of CO for each mole of olefin. Molar excess of carbon monoxide is generally used.

The temperature at which the reaction is carried out generally ranges from about 75° C. up to about 300° C. Temperatures from about 100° C. to about 250° C. are conveniently used.

Reaction times are not critical per se. Better yields are generally obtained at higher temperature and/or longer reaction times. Good yields are obtained in from about 10 to about 30 hours at the higher reaction temperatures.

The products obtained in the present process generally are mixtures of isomers of alcohols and/or aldehydes. The alcohols and/or aldehydes have one more carbon atom than the starting olefin. The following equation illustrates the reaction. Tetradecene-1 is used as an example of a typical olefin.

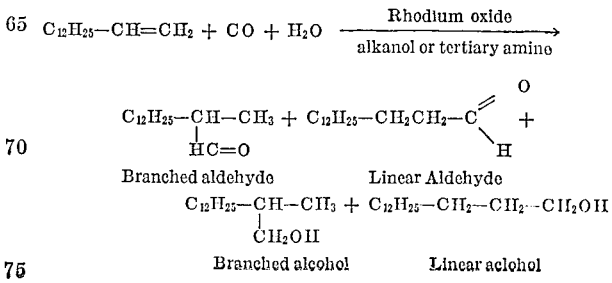

The weight ratio of linear to branched products ranges in general from about 50/50 to about 30/70. In other words, if the product obtained is 100 percent aldehyde, then from 30 to about 50 percent of this aldehyde will be the linear aldehyde, while the remainder will be the branched isomer; and likewise where both alcohol and aldehyde are present, linear and branched isomers of both the alcohol and of the aldehyde will each be found in ratios disclosed above.

In the following examples, all parts are by weight unless otherwise specified. The yield is the measure of olefin which reacts. It is calculated as follows:

$$\text{Percent yield} = \frac{\text{moles of alcohol (or aldehyde)}}{\text{moles of olefin charged}} \times 100$$

EXAMPLE 1

A suitably sized autoclave was charged with 44.8 parts of 1-octene, about 64 parts of methanol, about 18 parts of water and 0.05 part of rhodium sesquioxide. The autoclave was pressuured with carbon monoxide to a gauge reading of about 190 atmospheres. The autoclave was then heated to 175° C.; the reaction was allowed to continue at this temperature for 20 hours. At the end of this time, the autoclave was cooled and the pressure was released. The product obtained was a mixture of $C_9$ alcohols and aldehydes. The yield was 17.6 percent $C_9$ alcohol and 50.2 percent $C_9$ aldehydes. The isomer distribution of $C_9$ alcohols and $C_9$ aldehydes as determined by Vapor Phase Chromatography (VPC) was for $C_9$ aldehydes—40.4 percent n-nonanol, 33.4 percent 2-methyl-n-octanol and 26.7 percent other isomers; for $C_9$ alcohols—32.4 percent n-nonanol, 32.2 percent 2-methyl-n-octanol and 35.4 percent other isomers.

Similar results are obtained when isopropanol, n-octadecanol, 2-ethyl-n-hexanol, 3-decanol, n-dodecanol, or tert-butanol are used in place of the methanol in the above example.

EXAMPLE 2

An autoclave was charged with 44.8 parts of 1-octene, 18 parts of water, about 51 parts of N-methylpyrrolidine and 0.05 part of rhodium sesquioxide. The autoclave was then pressured with carbon monoxide to about 190 atmospheres. The reaction mixture was then heated to about 175° C. and the reaction was allowed to proceed for nine hours. At the end of this time, the autuoclave was cooled and the pressure was released. The product obtained was a mixture of $C_9$ alcohols and $C_9$ aldehydes. The yield was 26.7 percent $C_9$ aldehydes and 61.7 percent $C_9$ alcohols. The isomer distribution as obtained by VPC was for $C_9$ aldehydes—18.8 percent linear, 37.5 percent $\alpha$-methyl and 43.7 percent other isomers; for $C_9$ alcohols—40.7 percent linear, 38.0 percent $\alpha$-methyl and 21.3 percent other isomers.

Similar results are obtained when N-n-dodecylpyrrolidine, N-tert-butylpyrrolidine, N - n - nonylpyrrolidine, N-isopropylpyrrolidine or N-ethylpyrrolidine, N-n-butylpyrrolidine are used in place of n-methylpyrrolidine in the above example.

Examples 1 and 2 clearly illusutrate the process of the present invention. They also serve to demonstrate the effect of the reaction medium on the ratio of aldehyde/alcohol in the product. In Example 1, methanol is the reaction medium used. The ratio of $C_9$ aldehydes to $C_9$ alcohols in the product is about 3:1. In Example 2 N-methylpyrrolidine is the reaction medium used. All other reaction conditions are substantially the same as in Example 1. However, the ratio of $C_9$ aldehydes to $C_9$ alcohols found in the product is about 1:2. Thus, it is evident that the tertiary amine reaction medium favors alcohol formation while the alcohol reaction medium favors aldehyde formation.

The following examples further illustrate the process of the present invention.

EXAMPLE 3

An autoclave is charged with one mole of ethylene, one mole of ethanol, one mole of water and 0.0001 mole of $RhO_2$. Carbon monoxide is introduced into the vessel to a pressure of 200 atmospheres. The vessel is heated to 200° C. The mixture is then stirred at this temperature for 15 hours. At the end of this time, the vessel is allowed to cool. The pressure is released and the product is recovered.

A good yield of a mixture of $C_3$ alcohols and aldehydes is obtained; the aldehydes are the predominant product.

EXAMPLE 4

An autoclave is charged with one mole of triacontene, 0.1 mole of n-hexanol, 2 moles of water and 0.5 mole of $RhO_2$. Carbon monoxide is introduced into the vessel to a pressure of 300 atmospheres. The vessel is heated to 300° C. The mixture is then stirred at this temperature for 25 hours. At the end of this time, the vessel is allowed to cool. The pressure is released and the product is recovered.

A good yield of a mixture of $C_{41}$ alcohols and aldehydes is obtained; the aldehydes are the predominant product.

EXAMPLE 5

An autoclave is charged with one mole of 1-undecene, 3 moles of isoamyl alcohol, 5 moles of water and 0.05 mole of $Rh_2S_3$. Carbon monoxide is introduced into the vessel to a pressure of 500 atmospheres. The vessel is heated to 150° C. The mixture is then stirred at this temperature for 30 hours. At the end of this time, the vessel is allowed to cool. The pressure is released and the product is recovered.

A good yield of a mixture of $C_{12}$ alcohols and aldehydes is obtained; the aldehydes are the predominant product.

EXAMPLE 6

An autoclave is charged with one mole of diisobutylene, 0.5 mole of isopropanol, 4 moles of water and 0.15 mole of $Rh_2S_3$. Carbon monoxide is introduced into the vessel to a pressure of 50 atmospheres. The vessel is heated to 100° C. The mixture is then stirred at this temperature for 40 hours. At the end of this time, the vessel is allowed to cool. The pressure is released and the product is recovered.

A good yield of a mixture of $C_9$ alcohols and aldehydes is obtained; the aldehydes are the predominant product.

EXAMPLE 7

An autoclave is charged with one mole of 2-octadecene, 4 moles of n-butanol, 1.5 moles of water and 0.004 mole of $IrO_2$. Carbon monoxide is introduced into the vessel to a pressure of 400 atmospheres. The vessel is heated to 175° C. The mixture is then stirred at this temperature for 28 hours. At the end of this time, the vessel is allowed to cool. The pressure is released and the product is recovered.

A good yield of a mixture of $C_{19}$ alcohols and aldehydes is obtained; the aldehydes are the predominant product.

EXAMPLE 8

An autoclave is charged with one mole of 1,5-heptadiene, 8 moles of sec-butanol, 2.5 moles of water and 0.0005 mole of $Ir_2O_3$. Carbon monoxide is introduced into the vessel to a pressure of 10 atmospheres. The vessel is heated to 275° C. The mixture is then stirred at this temperature for 35 hours. At the end of this time, the vessel is allowed to cool. The pressure is released and the product is recovered.

A good yield of a mixture of mono-unsaturated $C_8$ alcohols and aldehydes is obtained; the aldehydes are the predominant product.

EXAMPLE 9

An autoclave is charged with one mole of 1,3-butadiene, 6 moles of n-propanol, 4.5 moles of water and 0.02 mole of $IrS_2$. Carbon monoxide is introduced into the vessel to a pressure of 75 atmospheres. The vessel is heated to 190° C. The mixture is then stirred at this temperature for 18 hours. At the end of this time, the vessel is allowed to cool. The pressure is released and the product is recovered.

A good yield of a mixture of monounsaturated $C_5$ alcohols and aldehydes is obtained; the aldehydes are the predominant product.

EXAMPLE 10

An autoclave is charged with one mole of a mixture of 50 percent octenes and 50 percent decenes, 5 moles of tert-butanol, 9 moles of water and 0.00005 mole of $Rh_2O_3$. Carbon monoxide is introduced into the vessel to a pressure of 250 atmospheres. The vessel is heated to 225° C. The mixture is then stirred at this temperature for 22 hours. At the end of this time, the vessel is allowed to cool. The pressure is released and the product is recovered.

A good yield of a mixture of $C_9$ and $C_{11}$ alcohols and aldehydes is obtained; the aldehydes are the predominant product.

EXAMPLE 11

An autoclave is charged with one mole of cyclohexene, 2 moles of 2-ethyl-1-hexanol, 1.1 moles of water and 0.006 mole of $RhO_2$. Carbon monoxide is introduced into the vessel to a pressure of 160 atmospheres. The vessel is heated to 125° C. The mixture is then stirred at this temperature for 14 hours. At the end of this time, the vessel is allowed to cool. The pressure is released and the product is recovered.

A good yield of a mixture of cyclohexyl carbinol and cyclohexyl aldehyde is obtained; the cyclohexyl carbinol is the predominant product.

Similar results are obtained when n-dodecanol, n-octanol, 2-decanol or 3-pentanol are used in place of the 2-ethyl-1-hexanol in Example 11.

EXAMPLE 12

An autoclave is charged with one mole of tetracontene, 10 moles of tri-n-propylamine, 10 moles of water and 0.4 mole of RhS. Carbon monoxide is introduced into the vessel to a pressure of 450 atmospheres. The vessel is heated to 260° C. The mixture is then stirred at this temperature for 38 hours. At the end of this time, the vessel is allowed to cool. The pressure is released and the product is recovered.

A good yield of a mixture of $C_{41}$ alcohols and aldehydes is obtained; the alcohols are the predominant product.

Similar results are obtained when triethylamine, tri-n-hexylamine, dimethyl-n-propylamine, tri-tert-butylamine are used in place of tri-n-propylamine in Example 12.

EXAMPLE 13

An autoclave is charged with one mole of tetracosene, 0.0004 mole of $IrO_2$, 8 moles of water and 7 moles of N,N,N',N' - tetramethylethylenediamine. Carbon monoxide is introduced into the vessel to a pressure of 225 atmospheres. The vessel is heated to 240° C. The mixture is then stirred at this temperature for 32 hours. At the end of this time, the vessel is allowed to cool. The pressure is released and the product is recovered.

A good yield of a mixture of $C_{25}$ alcohols and aldehydes is obtained; the alcohols are the predominant product.

Similar results are obtained when N,N,N',N'-tetra-n-hexylethylenediamine, N,N,N',N'-tetraethyl-1,3-propanediamine, or N,N,N',N'-tetraisopropyl-1,4-butane diamine are used in place of the amine in Example 13.

EXAMPLE 14

An autoclave is charged with one mole of 3-tetradecene, 0.4 mole of N,N'-dimethylbenzylamine, 2.5 moles of water and 0.003 mole of $IrS_2$. Carbon monoxide is introduced into the vessel to a pressure of 425 atmospheres. The vessel is heated to 285° C. The mixture is then stirred at this temperature for 32 hours. At the end of this time, the vessel is allowed to cool. The pressure is released and the product is recovered.

A good yield of a mixture of $C_{15}$ alcohols and aldehydes is obtained; the alcohols are the predominant product.

When tribenzylamine, n-butyl-bis(5 - phenyl-n-pentyl) amine, dibenzylethylamine, di-n-propyl-(2-phenylethyl) amine are used in place of the amine in Example 14, similar results are obtained.

EXAMPLE 15

An autoclave is charged with one mole of 1-pentene, 1.2 moles of N-methylpiperidine, 2.8 moles of water and 0.00015 mole of $RhO_2$. Carbon monoxide is introduced into the vessel to a pressure of 185 atmospheres. The vessel is heated to 180° C. The mixture is then stirred at this temperature for 21 hours. At the end of this time, the vessel is allowed to cool. The pressure is released and the product is recovered.

A good yield of a mixture of $C_6$ alcohols and aldehydes is obtained; the alcohols are the predominant product.

Comparable results are obtained when the N-methylpiperidine in Example 15 is replaced with N-ethylpiperidine, N-cyclohexylpiperidine, N-n-decylpiperidine, N-isopropylpiperidine, N-tertbutylpiperidine or N-neopentylpiperidine.

EXAMPLE 16

An autoclave is charged with one mole of a mixture of hexenes (40 percent 1-hexene, 38 percent 2-hexene, 18 percent 3-hexene, 4 percent other $C_6$ amines), 0.9 mole of N-methylmorpholine, 6 moles of water and 0.0003 mole of $Rh_2S_3$. Carbon monoxide is introduced into the vessel to a pressure of 100 atmospheres. The vessel is heated to 130° C. The mixture is then stirred at this temperature for 18 hours. At the end of this time, the vessel is allowed to cool. The pressure and the product is recovered.

A good yield of a mixture of $C_7$ alcohols and aldehydes is obtained; the alcohols are the predominant product.

When N-ethylmorpholine is used in place of the N-methylmorpholine, equivalent results are obtained.

EXAMPLE 17

An autoclave is charged with one mole of a mixture of monoolefins (30 percent $C_8$, 40 percent $C_{10}$, 30 percent $C_{12}$), 2.3 moles of N,N'-dimethylpiperazine, 8 moles of water and 0.00015 mole of $IrS_2$. Carbon monoxide is introduced into the vessel to a pressure of 210 atmospheres. The vessel is heated to 215° C. The mixture is then stirred at this temperature for 26 hours. At the end of this time, the vessel is allowed to cool. The pressure is released and the product is recovered.

A good yield of a mixture of $C_9$ $C_{11}$ and $C_{13}$ alcohols and aldehydes is obtained; the alcohols are the predominant product.

Similar results are obtained when the N,N'-dimethylpiperazine in Example 17 is replaced with N,N'-diethylpiperazine, N,N'-dicyclohexylpiperazine, N,N'-diisopropylpiperazine, N,N'-di-n-decylpiperazine or N,N'-di-n-butylpiperazine.

EXAMPLE 18

An autoclave is charged with one mole of 1,8-octadiene, 8 moles of 1,1,4,7,10,10-hexamethyltriethylenetetramine, 3 moles of water and 0.0004 mole of $Rh_2O_3$. Carbon monoxide is introduced into the vessel to a pressure of 450 atmospheres. The vessel is heated to 130° C. The mixture is then stirred at this temperature for 12 hours. At the end of this time, the vessel is allowed to cool. The pressure is released and the product is recovered.

A good yield of a mixture of monounsaturated $C_9$ alcohols and aldehydes is obtained; the alcohols are the predominant product.

Similar results are obtained when the amine in Example 18 is replaced with 1,1,4,7,7-pentaethyldiethylenetriamine, 1,1,4,7,10,13,13 - heptamethyltetraethylenepentamine, and the like.

EXAMPLE 19

An autoclave is charged with one mole of 4,6-dimethyl-1-heptene, 0.7 mole of N-isopropylpyrrolidine, 1.8 moles of water and 0.01 mole of $Ir_2O_3$. Carbon monoxide is introduced into the vessel to a pressure of 120 atmospheres. The vessel is heated to 195° C. The mixture is then stirred at this temperature for 17 hours. At the end of this time, the vessel is allowed to cool. The pressure is released and the product is recovered.

A good yield of a mixture of $C_{11}$ alcohols and aldehydes is obtained; the alcohols are the predominant product.

EXAMPLE 20

An autoclave is charged with one mole of 1,3-decadiene, 2.2 moles of N-n-butylpyrrolidine, 2.4 moles of water and 0.0009 mole of $RhO_2$. Carbon monoxide is introduced into the vessel to a pressure of 215 atmospheres. The vessel is heated to 115° C. The mixture is then stirred at this temperature for 37 hours. At the end of this time, the vessel is allowed to cool. The pressure is released and the product is recovered.

A good yield of a mixture of monounsaturated $C_{11}$ alcohols and aldehydes is obtained; the alcohols are the predominant product.

The aldehyde and alcohol mixtures obtained from the present process have many uses. They can be used, for example as solvents; as chemical intermediates for preparing carboxylic acids; as plasticizers, and the like. The mixture of aldehyde and alcohols produced may be used as such, or if desired, they may be separated into their component aldehydes and alcohols. Separation although difficult, can be effected by methods known to those skilled in the art. For example, alcohols and aldehydes may be separated by absorption.

Having fully described the invention, it is desired that it be limited only within the spirit and scope of the claims.

I claim:

1. A process for preparing mixtures of alcohols and aldehydes wherein said alcohols predominate which comprises reacting an olefin having from 2 to 40 carbon atoms with carbon monoxide and water in the presence of from 0.1 to 10 moles of tertiary amine reaction medium per mole of said olefin, said amine being selected from the group consisting of
   (a) N-alkyl morpholines, N-alkylpyrrolidines, N-alkylpiperidines, and N,N'-dialkylpiperazines wherein said N-alkyl groups are independently selected from $C_1$–$C_{12}$ alkyl groups,
   (b) amines having the formulae

and

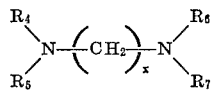

wherein $R_1$–$R_3$ are independently selected from $C_2$–$C_{12}$ alkyl groups and phenyl $C_1$–$C_{22}$ alkyl groups, $R_4$–$R_7$ are independently selected from $C_1$–$C_6$ alkyl groups, and $x$ is an integer from 2–4 and
   (c) fully alkylated alkylene polyamines having 3–5 amine nitrogens and wherein said alkyl groups have 1–4 carbon atoms, in the presence of a catalyst selected from the group consisting of the oxides and sulfides of rhodium and iridium at temperatures of from about 75° C. to about 300° C. and at pressures of from about 10 atmospheres to about 500 atmospheres, said alcohols and aldehydes having at least one carbon atom more than said olefin.

2. A process for preparing mixtures of alcohols and aldehydes wherein said alcohols predominate which comprises reacting an olefin having from 2 to 40 carbon atoms with carbon monoxide and water in the presence of from 0.1 to 10 moles of tertiary amine reaction medium per mole of said olefin, wherein said amine is selected from the group consisting of N-$C_1$–$C_4$-alkylpyrrolidines; N-$C_1$–$C_4$-alkylpiperidines; N-$C_1$–$C_4$-alkylmorpholines; N,N'-di-$C_1$–$C_4$-alkylpiperazines, fully alkylated ethylene polyamines having 3–5 amine nitrogens and wherein the alkyl groups have 1–4 carbon atoms, and amines having the formulae

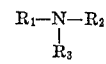

and

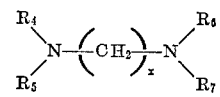

wherein $R_1$–$R_3$ are independently selected from $C_2$–$C_4$ alkyl groups and phenyl-$C_1$–$C_4$-alkyl groups, $R_4$–$R_7$ are independently selected from $C_2$–$C_4$ alkyl groups, and $x$ is 2 or 3, in the presence of a catalyst selected from the group consisting of the oxides and sulfides of rhodium and iridium at temperatures of from about 75° C. to about 300° C. and at pressures of from about 10 atmospheres to about 500 atmospheres, said alcohols and aldehydes having at least one carbon atom more than said olefin.

3. The process of claim 2 wherein said catalyst is an oxide.

4. The process of claim 3 wherein said catalyst is an oxide of rhodium.

5. The process of claim 4 wherein said olefin is a monoolefin.

6. The process of claim 5 wherein said olefin is octene, said reaction medium is N-methylpyrrolidine and said catalyst is rhodium sesquioxide.

7. The process of claim 2 wherein said amine is an N-$C_1$–$C_4$ alkylpyrrolidine.

8. The process of claim 2 wherein said amine has the formula

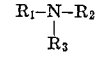

9. The process of claim 7 wherein said catalyst is an oxide.

10. The process of claim 7 wherein said catalyst is a rhodium oxide.

11. The process of claim 10 wherein said oxide is rhodium sesquioxide.

12. The process of claim 8 wherein said catalyst is an oxide.

13. The process of claim 8 wherein said catalyst is a rhodium oxide.

14. The process of claim 2 wherein said olefin is a monoolefin.

15. The process of claim 7 wherein said olefin is a monoolefin.

16. The process of claim 10 wherein said olefin is a monoolefin.

17. The process of claim 11 wherein said olefin is a monoolefin.

18. The process of claim 7 wherein said olefin is an α-monoolefin.

19. The process of claim 10 wherein said olefin is an α-monoolefin.

20. The process of claim 11 wherein said olefin is an α-monoolefin.

21. The process of claim 7 wherein said amine is N-methylpyrrolidine.

22. The process of claim 21 wherein said catalyst is rhodium sesquioxide.

23. The process of claim 1 wherein said olefin is a monoolefin.

24. The process of claim 1 wherein said olefin is an α-monoolefin.

25. The process of claim 23 wherein said catalyst is an oxide of rhodium.

26. The process of claim 25 wherein said oxide is rhodium sesquioxide.

References Cited

UNITED STATES PATENTS

| | | | |
|---|---|---|---|
| 3,020,314 | 2/1962 | Alderson | 260—604 X |
| 2,786,863 | 3/1957 | Kolbel et al. | 260—604 X |

FOREIGN PATENTS

| | | | |
|---|---|---|---|
| 801,734 | 9/1958 | Great Britain | 260—604 |

BERNARD HELFIN, Primary Examiner

R. H. LILES, Assistant Examiner

U.S. Cl. X.R.

260—598, 617 R, 632 R

PO-1050
(5/69)

UNITED STATES PATENT OFFICE
CERTIFICATE OF CORRECTION

Patent No. 3,657,354     Dated  April 18, 1972

Inventor(s)  Friedrich Asinger

It is certified that error appears in the above-identified patent and that said Letters Patent are hereby corrected as shown below:

Column 3, line 38, that portion of the formula reading $$\begin{matrix} N \\ | \\ R \end{matrix} \quad \text{should read} \quad \begin{matrix} N \\ | \\ R_2 \end{matrix}$$

Column 8, line 44, (Example 16) after "pressure" the phrase -- is released -- should be added Column 9, line 70, (Claim 1) the phrase "phenyl $C_1-C_{22}$" should read -- phenyl $C_1-C_{12}$ --

Column 10, line 31, (Claim 2) the phrase "$C_2-C_4$ alkyl groups" should read -- $C_1-C_4$ alkyl groups --

Signed and sealed this 8th day of August 1972.

(SEAL)
Attest:

EDWARD M. FLETCHER, JR.        ROBERT GOTTSCHALK
Attesting Officer              Commissioner of Patents